(12) United States Patent
Jeon et al.

(10) Patent No.: US 12,097,791 B2
(45) Date of Patent: Sep. 24, 2024

(54) VEHICLE SEATING SYSTEM HAVING CONVERTIBLE CENTER SEAT

(71) Applicant: Ford Global Technologies, LLC, Dearborn, MI (US)

(72) Inventors: Jung Jeon, Northville, MI (US); David William Gaines, Farmington, MI (US); Kurt Leon Kormos, Milford, MI (US); Macit Aktas, Windsor (CA); Shawn Anthony Dixon, Windsor (CA); Craig Rackers, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 18/092,984

(22) Filed: Jan. 4, 2023

(65) Prior Publication Data
US 2024/0217414 A1 Jul. 4, 2024

(51) Int. Cl.
*B60N 2/01* (2006.01)
*B60N 2/02* (2006.01)
*B60N 2/75* (2018.01)

(52) U.S. Cl.
CPC ............... *B60N 2/753* (2018.02); *B60N 2/01* (2013.01); *B60N 2/79* (2018.02); *B60N 2002/0288* (2013.01)

(58) Field of Classification Search
CPC .......... B60N 2/79; B60N 2/01; B60N 2/3097; B60N 2002/0288; B60N 2205/35
See application file for complete search history.

(56) References Cited

U.S. PATENT DOCUMENTS

| | | | |
|---|---|---|---|
| 137,062 A * | 3/1873 | Croghan | A47C 17/12 297/119 |
| 156,177 A * | 10/1874 | Schabel et al. | A47C 17/12 297/116 |
| 1,922,502 A * | 8/1933 | Scragg | B60N 2/3097 297/116 |
| 2,035,452 A * | 3/1936 | Bell | B60N 2/3018 297/116 |
| 2,621,708 A * | 12/1952 | Luce, Jr. | B60N 2/3043 297/233 |
| 2,790,485 A * | 4/1957 | Franklin | A47C 17/12 297/116 |

(Continued)

FOREIGN PATENT DOCUMENTS

| | | | | |
|---|---|---|---|---|
| DE | 102019119506 A1 * | 1/2021 | | |
| DE | 102021209728 A1 * | 3/2023 | ............... | B60N 2/06 |

(Continued)

*Primary Examiner* — Timothy J Brindley
(74) *Attorney, Agent, or Firm* — Vichit Chea; Price Heneveld LLP

(57) ABSTRACT

A seating system for a vehicle includes a first seat assembly having a first seat base and a first armrest that is convertible between an armrest position and a center seat position, and a second seat assembly having a second seat base and a second armrest that is convertible between an armrest position and a middle seat position. The seating system also includes a convertible third seat assembly located between the first and second seat assemblies and having a third seat formed by the first armrest and the second armrest in the middle seat position, wherein the first and second armrests are moveable between the armrest position and the center seat position.

14 Claims, 9 Drawing Sheets

(56) References Cited

U.S. PATENT DOCUMENTS

| | | | | |
|---|---|---|---|---|
| 7,093,904 | B1* | 8/2006 | McMillen | A47C 7/543 |
| | | | | 297/411.32 |
| 7,490,896 | B2* | 2/2009 | Smith | B60N 2/3043 |
| | | | | 297/188.1 |
| 7,823,950 | B2* | 11/2010 | Toyota | B60N 2/3038 |
| | | | | 296/65.01 |
| 7,980,617 | B2* | 7/2011 | Brncick | B60N 2/99 |
| | | | | 296/64 |
| 8,118,359 | B2 | 2/2012 | Kyogoku et al. | |
| 8,308,238 | B2* | 11/2012 | Imaoka | B60R 22/26 |
| | | | | 297/188.1 |
| 9,771,156 | B2* | 9/2017 | Brownjohn | B64D 11/0639 |
| 10,245,982 | B2* | 4/2019 | Khalid | B60N 2/3059 |
| 11,241,978 | B2* | 2/2022 | Da Silva | B60N 2/02 |
| 2017/0305306 | A1* | 10/2017 | Park | B60N 2/065 |

FOREIGN PATENT DOCUMENTS

| | | | |
|---|---|---|---|
| JP | 4135523 | B2 | 8/2008 |
| JP | 4380417 | B2 | 12/2009 |
| JP | 4622759 | B2 | 2/2011 |

* cited by examiner

VEHICLE SEATING SYSTEM HAVING CONVERTIBLE CENTER SEAT

FIELD OF THE DISCLOSURE

The present disclosure generally relates to vehicle seating assemblies, and more particularly relates to a flexible vehicle seating system that may be arranged in different configurations.

BACKGROUND OF THE DISCLOSURE

Seating assemblies are widely used in motor vehicles in configured seating systems. Some vehicle seating systems are designed to allow the seating assemblies to be configured in various positions to accommodate vehicle seating and movement within the vehicle. It would be desirable to provide for a seating system in a vehicle that allows for different seating assembly configurations.

SUMMARY OF THE DISCLOSURE

According to a first aspect of the present disclosure, a seating system for a vehicle is provided. The seating system includes a first seat assembly having a first seat base and a first armrest that is convertible between an armrest position and a middle seat position, a second seat assembly having a second seat base and a second armrest that is convertible between an armrest position and a middle seat position, and a convertible third seat assembly located between the first and second seat assemblies and having a third seat formed by the first armrest and the second armrest in the middle seat position, wherein the first and second armrests are moveable between the armrest position and the center seat position.

Embodiments of the first aspect of the present disclosure can include any one or a combination of the following features:
 the first seat assembly further comprises a first seatback and the second seat assembly further comprises a second seatback;
 the convertible third seat assembly further comprises a third seatback;
 the third seatback rotates between an upright seatback position and a folded down position;
 the third seatback rotates forward and down proximate to a floor of the vehicle in the folded down position;
 the third seatback has a first arm that pivots about a first hinge proximate to the vehicle floor and a second arm that pivots about a second hinge between the first hinge and an upper end of the seatback;
 the third seatback pivots forward and down to a horizontal position above the floor;
 the third seatback in the folded down position provides a console;
 each of the first and second armrests are each coupled to a support bracket and at least one control arm for pivoting the first armrest between the armrest position and the center seat position;
 the first armrest and the second armrest each comprise a cushion; and
 the seating system provides a second row of seating in the vehicle.

According to a second aspect of the present disclosure, a seating system for a vehicle is provided. The seating system includes a first seat assembly having a first seat base and a first armrest that is convertible between an armrest position and a middle seat position, a second seat assembly having a second seat base and a second armrest that is convertible between an armrest position and a middle seat position, and a convertible third seat assembly located between the first and second seat assemblies and having a third seat formed by the first armrest and the second armrest in the middle seat position, wherein the first and second armrests are moveable between the armrest position and the center seat position, wherein the first seat assembly further comprises a first seatback and the second seat assembly further comprises a second seatback, and wherein the convertible third seat assembly further comprises a third seatback.

Embodiments of the second aspect of the present disclosure can include any one or a combination of the following features:
 the third seatback rotates between an upright seatback position and a folded down position;
 the third seatback rotates forward and down proximate to a floor of the vehicle in the folded down position;
 the third seatback has a first arm that pivots about a first hinge proximate to the vehicle floor and a second arm that pivots about a second hinge between the first hinge and an upper end of the seatback;
 the third seatback pivots forward and down to a horizontal position above the floor;
 the third seatback in the folded down position provides a console;
 each of the first and second armrests are each coupled to a support bracket and at least one control arm for pivoting the first armrest between the armrest position and the center seat position;
 the first armrest and the second armrest each comprise a cushion; and
 the seating system provides a second row of seating in the vehicle.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
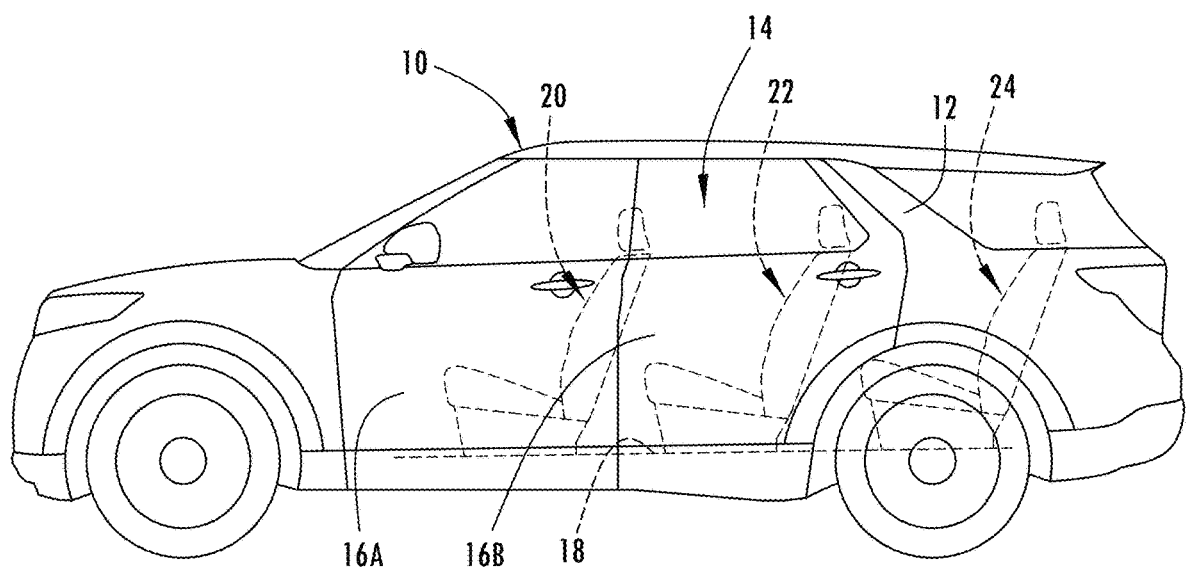
FIG. 1 is a side perspective view of a vehicle having rows of vehicle seating including a second row vehicle seating system configured with a convertible middle seat assembly, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a reconfigurable vehicle seating system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers. The motor vehicle 10 has a vehicle body 12 that generally defines a cabin interior 14. The cabin interior 14 may contain various features and trim components within the vehicle body 12. The cabin interior 14 is shown in one example having an arrangement of passenger seats including a front first row 20 of seat assemblies which may include a driver seat assembly and a passenger seat assembly, a middle second row 22 of seat assemblies and a rear third row 24 of seat assemblies. The seating arrangement includes three rows of seating, according to this example. The vehicle 10 may have other numbers of rows of seating including one or two rows of seat assemblies or more than three rows of seat assemblies as may exist for large SUVs, vans and buses, for example. It should be appreciated that the vehicle 10 may be a motor vehicle, such as a wheeled car, truck, SUV, van or bus, for example, or an airplane, train, boat or other vehicle capable of transporting one or more passengers.

The cabin interior 14 shown in FIG. 1 has a front first row 20 of seat assemblies, a middle second row 22 of seat assemblies and a third rear row 24 of seat assemblies, supported on the underlying vehicle floor 18. Some of the first, second and third rows of seat assemblies may each include one, two or three seating assemblies, according to some examples. In addition, the front first row 20 of seat assemblies are located proximate to a pair of front side doors 16A, and the middle second row 22 of seat assemblies are located proximate to a pair of rear side doors 16B. A driver or passenger may enter the cabin interior 14 of the vehicle 10 via a front side door 16A to access the front first row 20 of seat assemblies and a passenger may enter the cabin interior 14 of the vehicle 10 via a rear side door 16B to access the middle second row 22 of seat assemblies. In order to enter or exit the vehicle 10 to or from the rear third row 24 of seat assemblies, a passenger seated or to be seated in the rear third row 24 of vehicle seat assemblies may exit and enter the vehicle 10 via the rear side door 16B. In order to enable access to the rear third row 24 of seat assemblies, the middle second row 22 of seat assemblies may be configured to include a convertible center seat assembly that may be converted between a middle seating assembly and an open space providing an access point for users to pass between the middle second row 22 of seat assemblies and the rear third row 24 of seat assemblies. In addition, it should be appreciated that one or more of the seating assemblies of the middle second row 22 of seating assemblies may also pivot the seatback to a forward position to also allow access to the rear third row 24 of seating assemblies.

Figure 2:
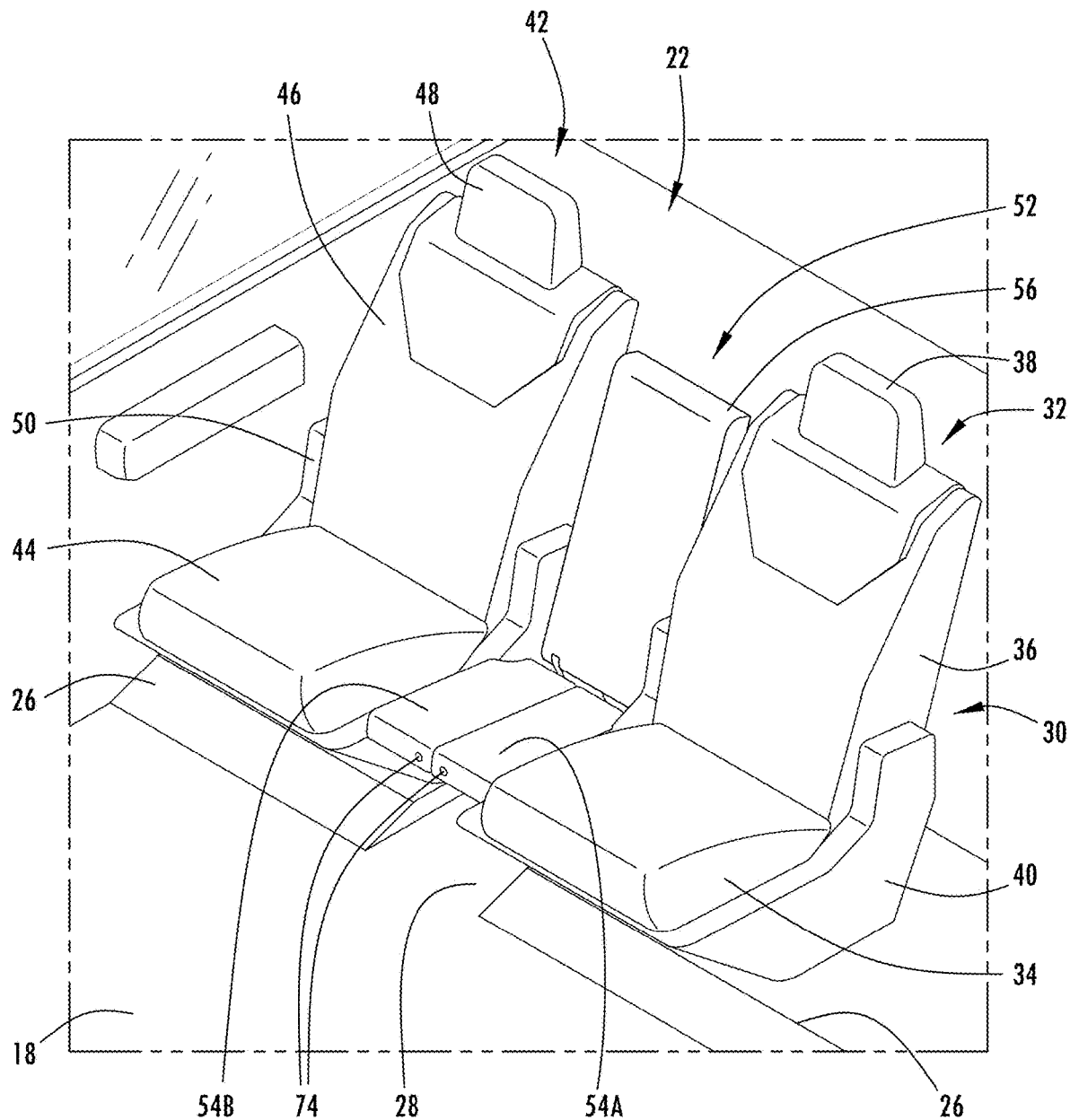
FIG. 2 is a front side perspective view of the second row seating system having the reconfigurable middle seat assembly in a seating configuration.

The middle second row 22 of seating assemblies forms a seating system 30 which is illustrated in FIG. 2. The seating system 30 includes a first seat assembly 32 located on a first lateral end side of the second row 22 of seat assemblies, proximate to an access door of the vehicle 10. The seating assembly 30 also includes a second seat assembly 42 located on an opposite lateral end side of the second row 22 of seat assemblies proximate to a lateral access door of the vehicle 10. The first seat assembly 32 is spaced from the second seat assembly 42 by a space that may be at least partially filled by a convertible third seat assembly 52. The convertible third seat assembly 52 is convertible between a middle seat assembly as shown in FIG. 2 and an open space as shown in FIG. 4 to allow access for a passenger to pass between the first and second seat assemblies 32 and 42 to access the third row 24 of seating, for example.

The first seat assembly 32 is shown having a first seat 34 supported on a seat base 40 which, in turn, is supported on a floor base 26 on top of the vehicle floor 18. The first seat assembly 32 also includes a first seatback 36 which has a first headrest 38 on the upper end. The first seatback 36 may pivot relative to the seat 34 between seating and reclined positions. The second seat assembly 42 likewise has a second seat 44 supported on a seat base 50 which, in turn, is supported on a floor base 26 which is supported on the vehicle floor 18. The second seat assembly 42 also includes a second seatback 46 having a second headrest 48 on the upper end. The second seatback 46 may pivot relative to the seat 44 between a reclined and seating positions.

Figure 7:
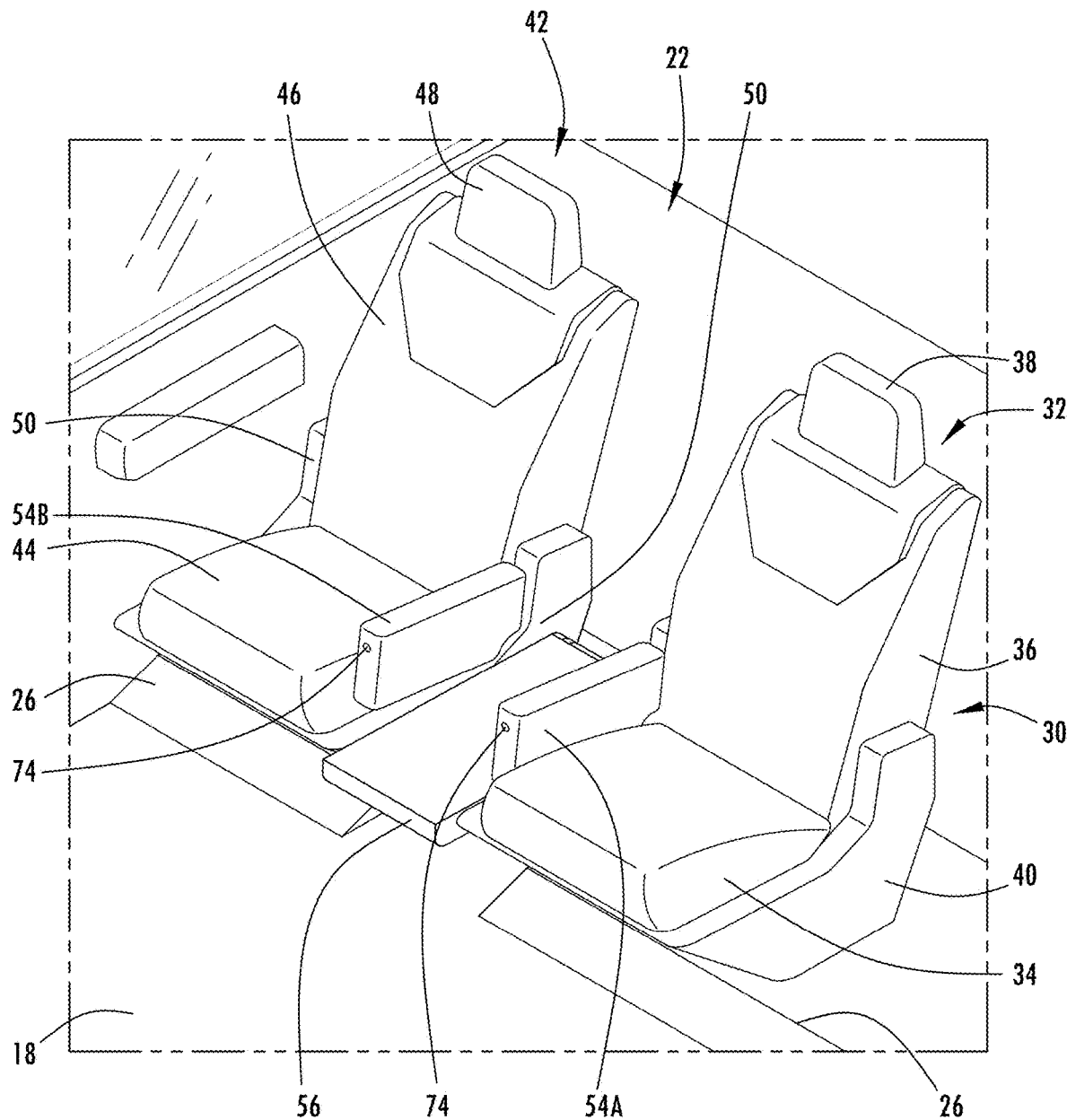
FIG. 7 is a front side perspective view of the seating system showing the seatback in an elevated floor console position.

The convertible third seat assembly 52 includes a convertible seat made up of a first armrest 54A connected to and associated with the first seat assembly 32 and a second armrest 54B connected to an associated with the second seat assembly 42. The first and second armrests 54A and 54B are cantilevered on the respective first and second seta assemblies 32 and 42. The first and second armrests 54A and 54B are shown in a middle seating configuration rotated downward and substantially horizontal and substantially aligned in the same plane to form a middle seat made up of two cantilevered portions. The convertible third seat assembly 52 also includes a third seatback 56 which may be configured on a back side as a console. The third seatback 56 may pivot between the upright seating position as shown in FIG. 2, a reclined and downward stowed floor console position proximate to the vehicle floor 18 as seen in FIG. 4, and a reclined and elevated console position elevated above the vehicle floor 18 as seen in FIG. 7.

Figure 3A:
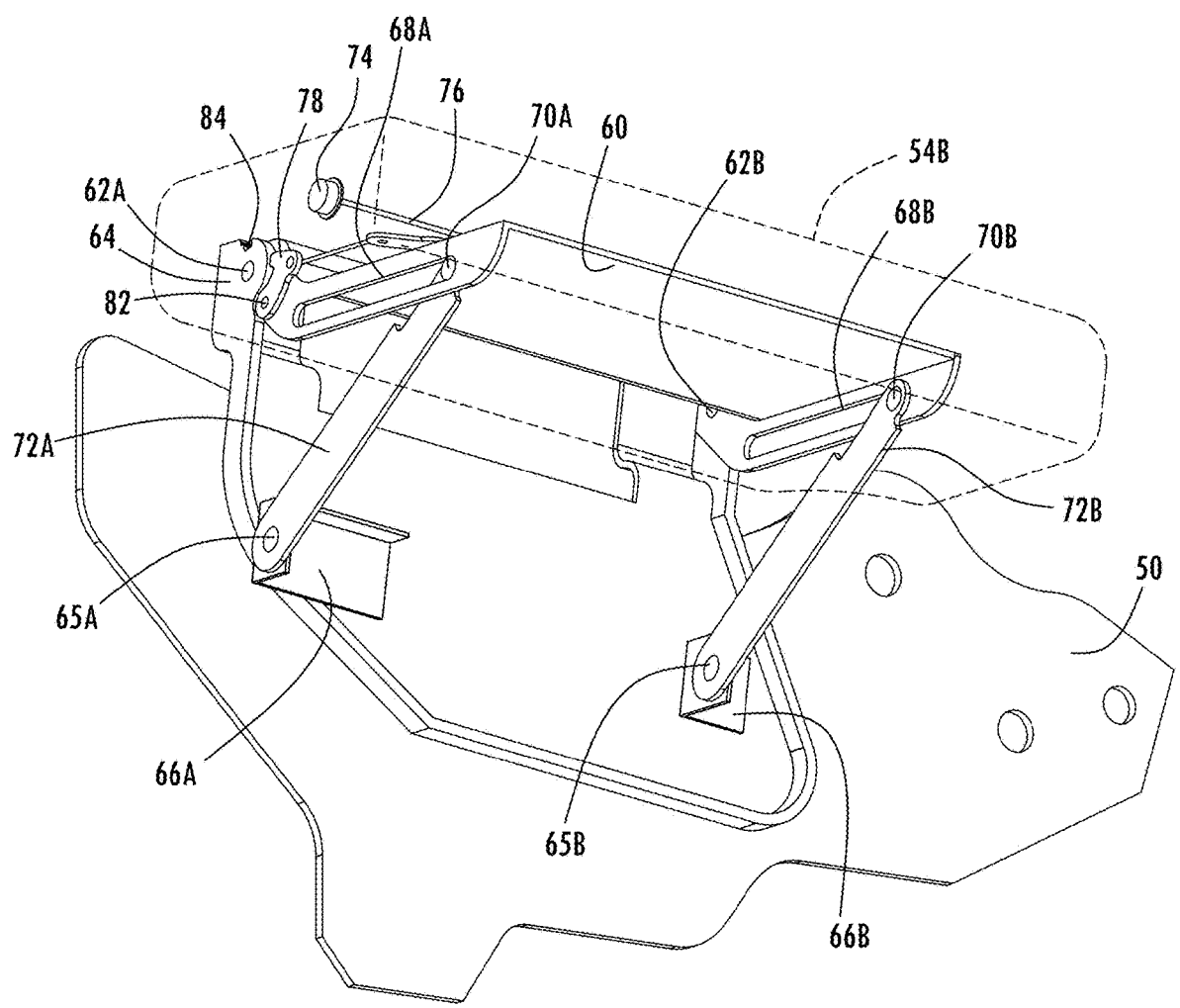
FIG. 3A is a lower side perspective view of an armrest assembly of a second row seating assembly in a middle seat configuration.
Figure 3B:
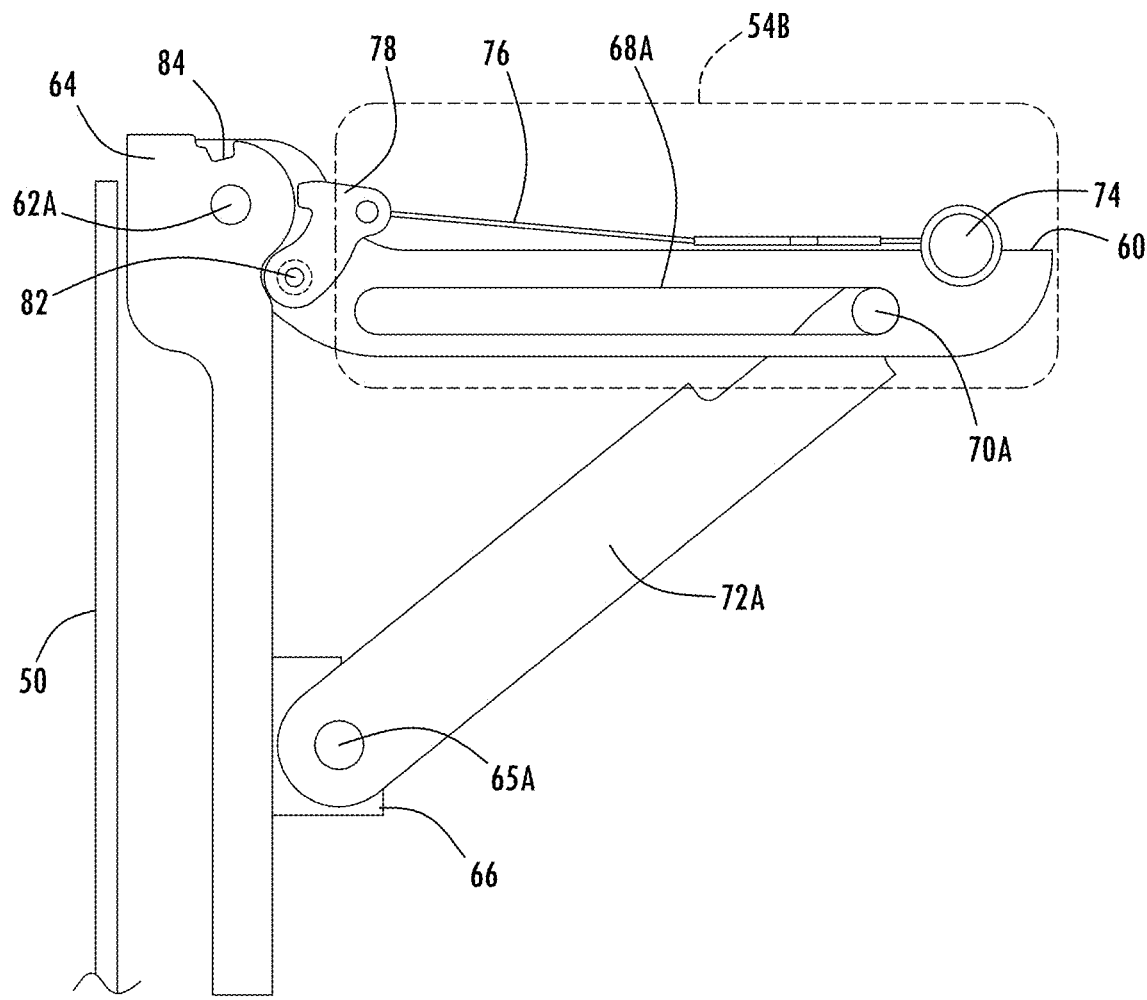
FIG. 3B is a front view of the armrest assembly in the middle seat configuration shown in FIG. 3A.
Figure 4:
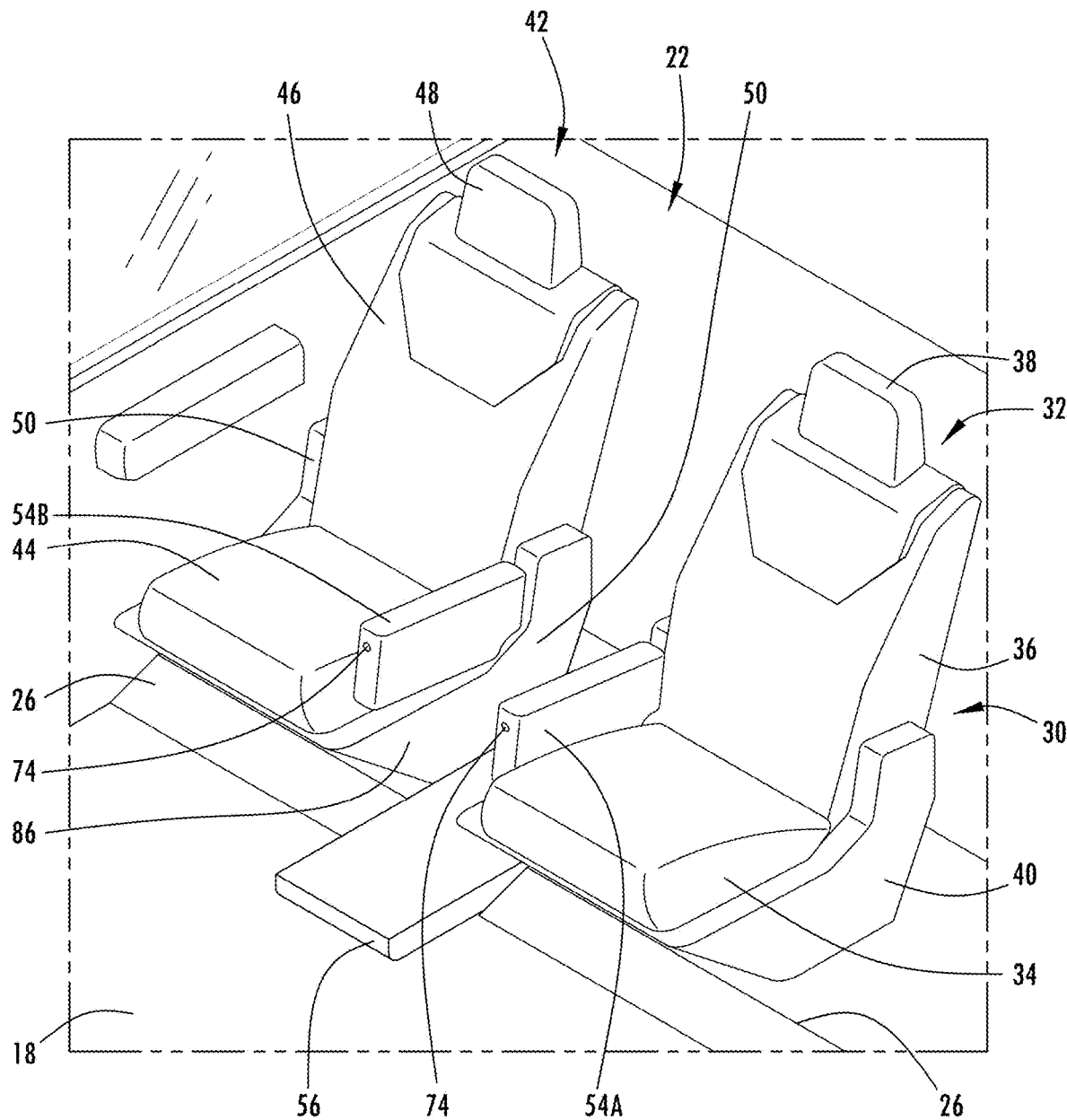
FIG. 4 is a front side perspective view of the second row seating system having the middle seat assembly in the armrest configuration.
Figure 5A:
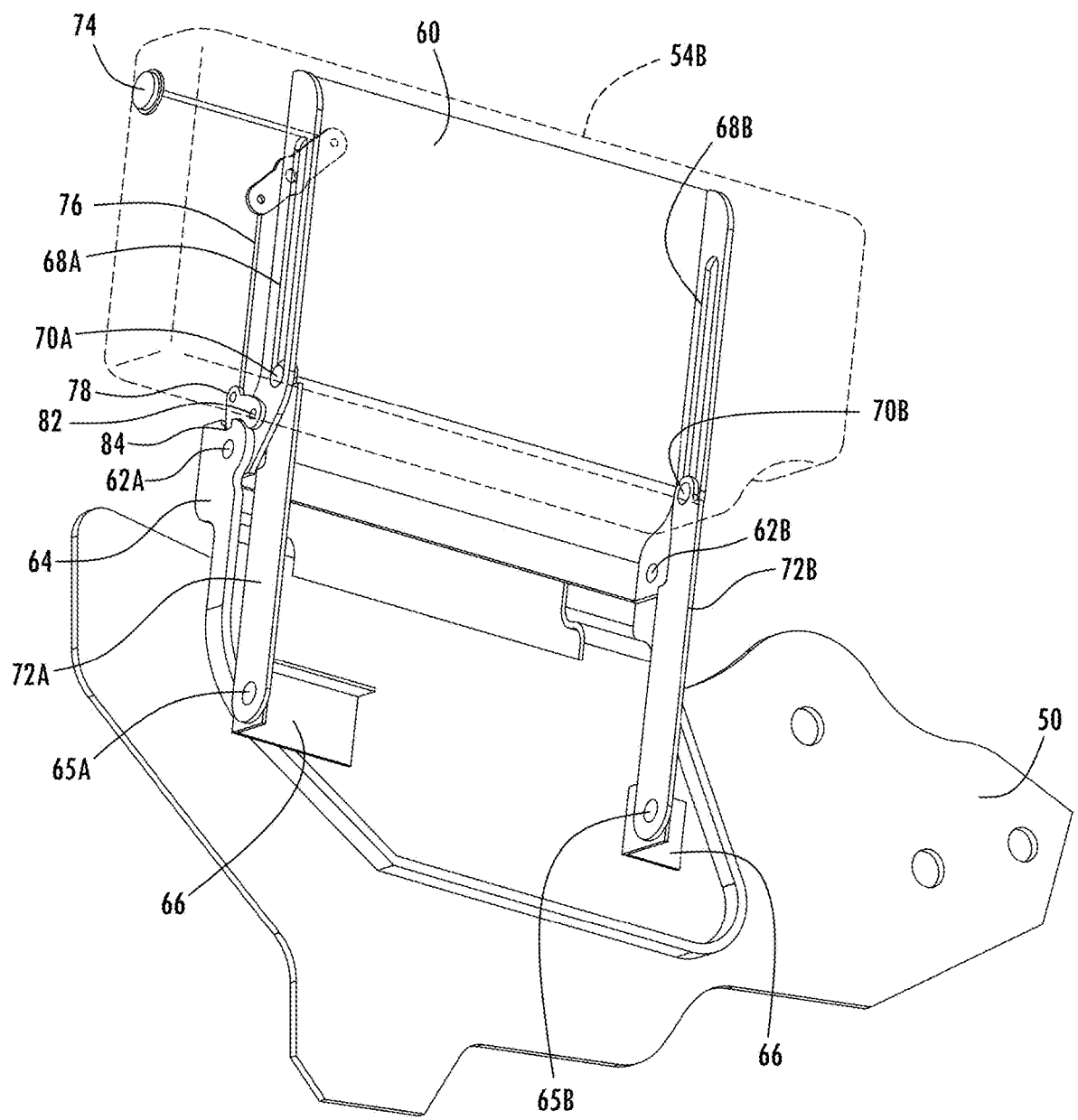
FIG. 5A is a lower side perspective view of the armrest assembly of the second seating assembly in an armrest configuration.

The first and second armrests 54A and 54B are each convertible between an armrest position shown in FIG. 4 associated with the corresponding adjacent first and second seat assemblies 32 and 42, respectively, and the seating position shown in FIG. 2. The first armrest 54A is shown in FIGS. 3A-3B cantilevered and rotated 90° downward from the first seat assembly 32 to the middle seating position to provide half of the convertible middle seat on one lateral side. It should be appreciated that the second armrest 54B likewise includes the same cantilevered structure associated with the second seating assembly to provide the other half of the convertible middle seat on the opposite lateral side. The first armrest 54A includes a cushion, with structural support such as a foam cushion, that is generally formed having a rectangular top surface for forming half of the convertible middle seat and a generally smaller rectangular portion at one end forming a rest upon which an arm of a passenger seated in the associated seat assembly may be supported when in the armrest position. The first armrest 54A is generally supported on top of an underlying support plate 60 which may pivot at one end about pivot pins 62A and 62B on opposite lateral sides of a support bracket 64. The pivot pins 62A and 62B pivot relative to a support bracket 64 which, in turn, is connected to the seat base 50 via brackets 66A and 66B. The support plate 60 includes a pair of slots 68A and 68B, one located on each side of the support plate 60 for receiving a sliding pin 70A or 70B, respectively, which is connected to a pivot linkage 72A or 72B that pivots relative to brackets 66A and 66B via pivot pins 65A and 65B. As such, the first armrest 54A forming the first seat may be rotated between the horizontal seating position shown in FIGS. 2, 3A and 3B by approximately 90° to the upstanding vertical armrest position shown in FIGS. 4, 5A and 5B.

The first armrest 54A includes a user input pushbutton 74 which has a control linkage 76 for controlling a latch 78. The latch 78 has a tooth 80 and pivots about a pivot 82. In the seating position, the pivot linkages 72A and 72B support the seat in the seating position. When the seat is rotated from the horizontal seating position approximately 90° upward to the armrest position, the tooth 80 of latch 78 engages a detent or slot 84 in support bracket 64 to lock the armrest 54A in the armrest position. To convert the middle seat from the armrest position to the seat position, a user may depress the user input button 74 to actuate and release the tooth 80 from the slot 84 to thereby allow the armrest 54A to pivot downward to the seating position. The second armrest 54B likewise has the same user input pushbutton and latch arrangement for releasing the second armrest 54B to pivot the armrest and seat positions.

Figure 5B:
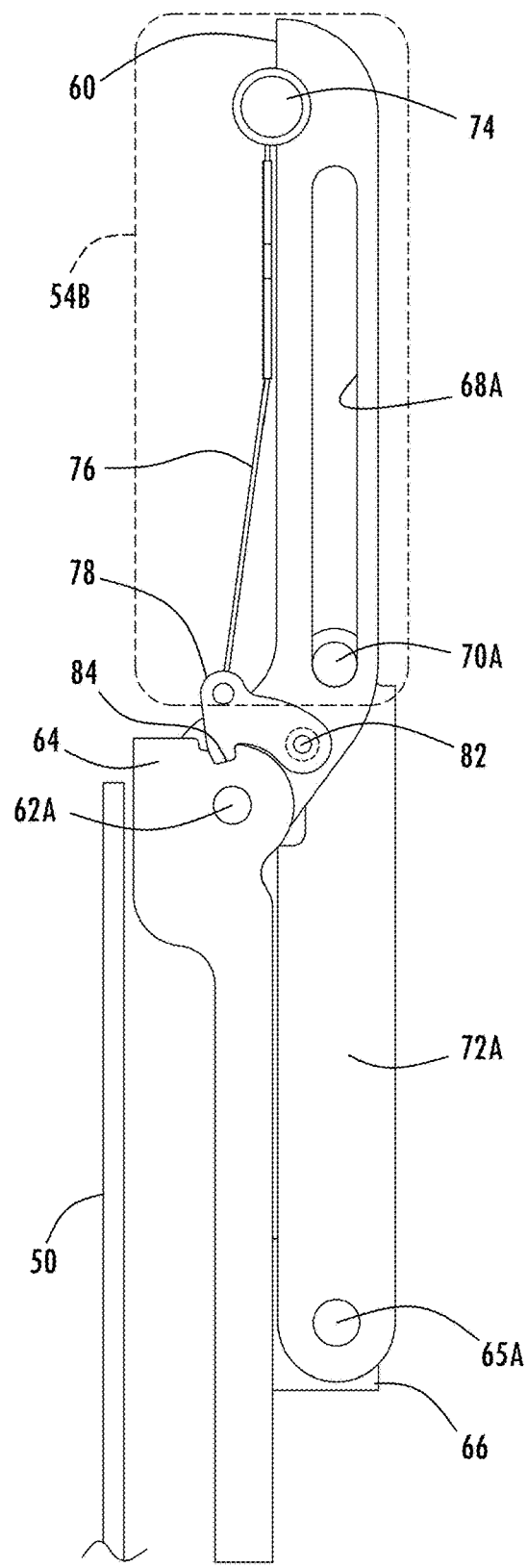
FIG. 5B is a front view of the armrest assembly in the middle seat configuration shown in FIG. 5A.

When the first and second armrests 54A and 54B are in the armrest position as seen in FIGS. 4-5B, the armrests 54A and 54B are positioned to enable a passenger seated on the corresponding first and second seat assemblies 32 and 42 to rests their arm on each of the respective armrests. In addition, the third seatback 56 may be rotated downward to a floor console position proximate to the vehicle floor 18 as seen in FIG. 4. In this floor console position, the back side of the seatback 56 may serve as a floor console, which may include a console structure with one or more drink holders and/or compartments and lid that may be opened to expose a storage compartment while resting on the floor 18. With the seatback 56 fully stowed and the armrests 54A and 54B in the armrest position, the space 86 between the first and second seat assemblies is generally open to enable a passenger to pass between the first and second seat assemblies 32 and 42 such as to access a rear third row of seating, for example.

Figure 6A:
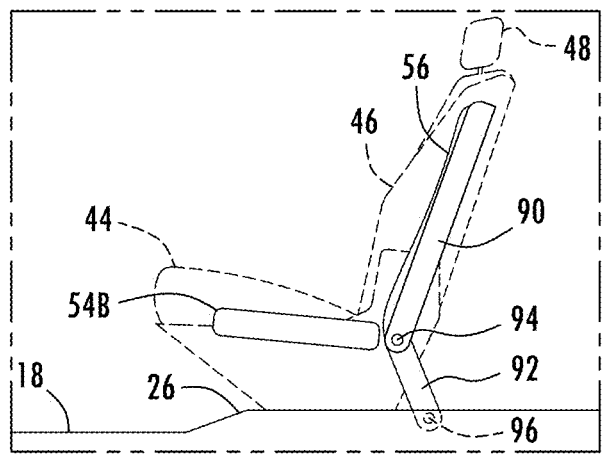
FIG. 6A is a side view of the middle seat assembly of the seating system shown with the first and second armrest assembly in the middle seating configuration.
Figure 6B:
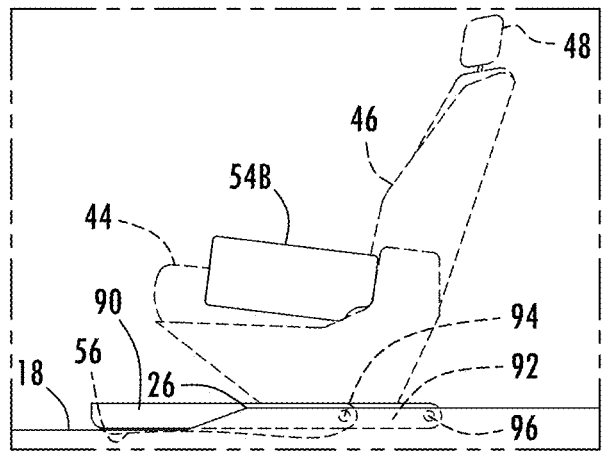
FIG. 6B is a side view of the middle seat assembly shown with the first and second armrest assemblies in the armrest configuration and the seatback in a floor console position.
Figure 6C:
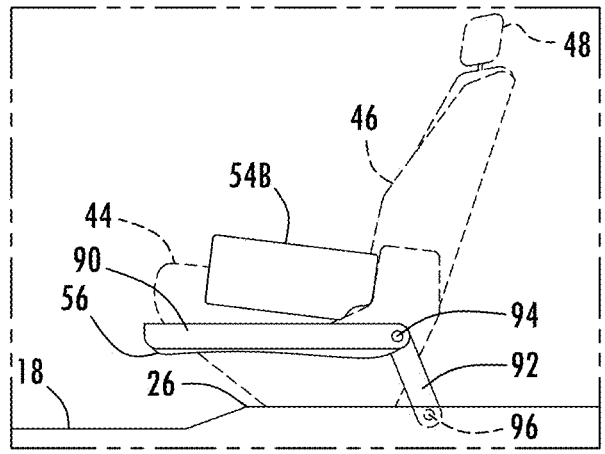
FIG. 6C is a side view of the middle seating assembly shown in the armrest configuration with the console in an elevated console position.

Referring to FIGS. 6A-6C, the third seatback 56 is generally shown in an upright seating position in FIG. 6A and in a fully stowed floor console position on the vehicle floor 18 in FIG. 6B, and an intermediate elevated console position as shown in FIG. 6C. The third seatback 56 includes dual pivot support arms located on each of opposite sides of the third seatback 56. The dual support arms includes an upper first arm 90 pivotally connected to a lower second arm 92 via a first pivot 94. The lower end of the second arm 92 is coupled to the seat mount via a second pivot 96. As such, the first arm 90 may pivot relative to the second arm 92 which may pivot relative to the seat base. This enables the seatback 56 to pivot forward and downward in a more compact way to be on the floor 18 as shown in FIG. 6B. It should further be appreciated that the third seatback 56 may be pivoted to an intermediate elevated console position elevated above the vehicle floor 18 with the second arm 92 in an upright position as shown in FIG. 6C and FIG. 7. As seen in FIG. 7, the third seatback 56 may be horizontal and elevated above the floor to provide a center console accessible to occupants of the first and second seat assemblies 32 and 42.

Accordingly, the seating system 30 advantageously provides for a convertible middle third seat that may be utilized as a middle seat or converted to armrests for first and second seat assemblies 32 and 42 and may be convertible to provide an open space for access to a rearward row of seating.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating system for a vehicle, the seating system comprising:
    a first seat assembly having a first seat base, a first seatback and a first armrest that is convertible between an armrest position and a middle seat position;
    a second seat assembly having a second seat base, a second seatback and a second armrest that is convertible between an armrest position and a middle seat position; and
    a convertible third seat assembly located between the first and second seat assemblies and having a third seat base formed by the first armrest and the second armrest in the middle seat position, wherein the first and second armrests are moveable between the armrest position and the center seat position, wherein the convertible third seat assembly has a third seatback that rotates between an upright seatback position and a folded down position, and wherein the third seatback rotates forward and down proximate to a floor of the vehicle in the folded down position.

2. The seating system of claim 1, wherein the third seatback has a first arm that pivots about a first hinge proximate to the vehicle floor and a second arm that pivots about a second hinge between the first hinge and an upper end of the seatback.

3. The seating system of claim 2, wherein the third seatback pivots forward and down to a horizontal position above the floor.

4. The seating system of claim 1, wherein the third seatback in the folded down position provides a console.

5. The seating system of claim 1, wherein each of the first and second armrests are each coupled to a support bracket and at least one control arm for pivoting the first armrest between the armrest position and the center seat position.

6. The seating assembly of claim 1, wherein the first armrest and the second armrest each comprise a cushion.

7. The seating assembly of claim 1, wherein the seating system provides a second row of seating in the vehicle.

8. A seating system for a vehicle, the seating system comprising:
    a first seat assembly having a first seat base and a first armrest that is convertible between an armrest position and a middle seat position;
    a second seat assembly having a second seat base and a second armrest that is convertible between an armrest position and a middle seat position; and
    a convertible third seat assembly located between the first and second seat assemblies and having a third seat base formed by the first armrest and the second armrest in the middle seat position, wherein the first and second armrests are moveable between the armrest position and the center seat position, wherein the first seat assembly further comprises a first seatback and the second seat assembly further comprises a second seatback, and wherein the convertible third seat assembly further comprises a third seatback, wherein the third seatback rotates between an upright seatback position and a folded down position, and wherein the third seatback rotates forward and down proximate to a floor of the vehicle in the folded down position.

9. The seating system of claim 8, wherein the third seatback has a first arm that pivots about a first hinge proximate to the vehicle floor and a second arm that pivots about a second hinge between the first hinge and an upper end of the seatback.

10. The seating system of claim 9, wherein the third seatback pivots forward and down to a horizontal position above the floor.

11. The seating system of claim 8, wherein the third seatback in the folded down position provides a console.

12. The seating system of claim 8, wherein each of the first and second armrests are each coupled to a support bracket and at least one control arm for pivoting the first armrest between the armrest position and the center seat position.

13. The seating system of claim 8, wherein the first armrest and the second armrest each comprise a cushion.

14. The seating system of claim 8, wherein the seating system provides a second row of seating in the vehicle.

* * * * *